United States Patent
Huang et al.

(10) Patent No.: US 10,743,178 B2
(45) Date of Patent: *Aug. 11, 2020

(54) REDUCED RESOLUTION LOCATION DETERMINATION FOR IMPROVED ANONYMITY OF USER LOCATION

(71) Applicant: Apple Inc., Cupertino, CA (US)

(72) Inventors: Ronald K. Huang, San Jose, CA (US); Lukas M. Marti, Santa Clara, CA (US); Stephen J. Rhee, San Jose, CA (US); Robert Mayor, Half Moon Bay, CA (US); Tadaaki Shimada, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,499

(22) Filed: Sep. 28, 2018

(65) Prior Publication Data

US 2019/0274035 A1 Sep. 5, 2019

Related U.S. Application Data

(63) Continuation of application No. 14/502,869, filed on Sep. 30, 2014, now Pat. No. 10,091,646.

(Continued)

(51) Int. Cl.
*G06F 12/02* (2006.01)
*H04W 12/02* (2009.01)
(Continued)

(52) U.S. Cl.
CPC .......... *H04W 12/02* (2013.01); *G01S 19/39* (2013.01); *G01S 19/42* (2013.01);
(Continued)

(58) Field of Classification Search
USPC .......................................................... 707/705
See application file for complete search history.

(56) References Cited

U.S. PATENT DOCUMENTS 8,463,772 B1    6/2013   Aminzade et al.
8,495,046 B1 *  7/2013   Buchanan ............ G08G 1/0133
                                                      701/426

(Continued)

FOREIGN PATENT DOCUMENTS

WO   WO 2012/076040    6/2012
WO   WO 2014/022101    2/2014

OTHER PUBLICATIONS

Ferri Olumofin, Piotr K. Tysowski, Ian Goldberg, URs Hengartner, "Achieving efficient Query Privacy for Location Based Services", Jul. 21-23, 2010, PETS'10 Proceedings of the 10th international conference on Privacy enhancing technologies pp. 93-110 (Year: 2010).*

(Continued)

Primary Examiner — Hosain T Alam
Assistant Examiner — Robert F May
(74) Attorney, Agent, or Firm — Fish & Richardson P.C.

(57) ABSTRACT

Reduced resolution location determination for improved anonymity of a user location is disclosed. In some implementations, a first location of a computing device operating in a geographic area is determined. A population density of the geographic area is estimated. A grid overlay is generated, including a number of cells based on the estimated population density. Using the grid overlay, a second location is generated for the computing device that is less precise than the first location. The less precise second location can be used in a local search or other application to improve the anonymity of the user location.

20 Claims, 5 Drawing Sheets

Related U.S. Application Data

(60) Provisional application No. 62/044,176, filed on Aug. 29, 2014.

(51) Int. Cl.

| | | |
|---|---|---|
| *G06F 21/62* | (2013.01) | |
| *H04L 29/12* | (2006.01) | |
| *G01S 19/39* | (2010.01) | |
| *G01S 19/42* | (2010.01) | |
| *H04W 8/16* | (2009.01) | |
| *H04W 64/00* | (2009.01) | |
| *H04L 29/06* | (2006.01) | |
| *H04W 12/00* | (2009.01) | |

(52) U.S. Cl.
CPC ........ *G06F 21/6254* (2013.01); *H04L 61/609* (2013.01); *H04W 8/16* (2013.01); *H04W 64/00* (2013.01); *H04L 63/0407* (2013.01); *H04L 63/107* (2013.01); *H04W 12/00503* (2019.01)

(56) References Cited

U.S. PATENT DOCUMENTS

| | | | |
|---|---|---|---|
| 10,091,646 B2 | 10/2018 | Huang et al. | |
| 2002/0077127 A1* | 6/2002 | Heckard | H04W 12/02 455/457 |
| 2003/0187803 A1* | 10/2003 | Pitt | G06Q 20/382 705/64 |
| 2010/0064373 A1* | 3/2010 | Cai | G06F 21/6254 726/26 |
| 2010/0318535 A1 | 12/2010 | Weber et al. | |
| 2013/0261954 A1* | 10/2013 | Boschker | G01C 21/00 701/410 |
| 2014/0029468 A1* | 1/2014 | Akgul | H04W 48/14 370/254 |
| 2014/0032326 A1 | 1/2014 | Li et al. | |
| 2014/0074820 A1 | 3/2014 | Murphy | |
| 2014/0141803 A1 | 5/2014 | Marti et al. | |
| 2016/0066179 A1 | 3/2016 | Huang et al. | |

OTHER PUBLICATIONS

Shokri R., Theodorakopoulos G., Danezis G., Hubaux JP., Le Boudec JY. "Quantifying Location Privacy: The Case of Sporadic Location Exposure" Jul. 27-29, 2011, PETS'11 Proceedings of the 11th International Conference on Privacy Enhancing Technologies pp. 57-76 (Year: 2011).*

Olteanu AM., Huguenin K., Shokri R., Hubaux JP. "Quantifying the Effect of Co-location Information on Location Privacy", Jul. 16-18, 2014, PETS'14 Proceedings of the 14th International conference on Privacy enhancing technologies pp. 184-203 (Year: 2014).*

Femi Olumofin, Piotr K. Tysowski, Ian Goldberg, URs Hengartner, "Achieving efficient Query Privacy for Location Based Services", Jul. 12-23, 2010, PETS'10 Proceedings of the 10th international conference on Privacy enhancing technologies pp. 93-110.

International Search Report and Written Opinion in International Application No. PCT/US2015/043856, dated Feb. 29, 2016, 19 pages.

Invitation to Pay Additional Fees and, Where Applicable, Protest Fee in Application No. PCT/US2015/043856, dated Nov. 11, 2015, 8 pages.

Olumofin et al., "Achieving Efficient Query Privacy for Location Based Services," Privacy Enhancing Technologies, pp. 93-110 (Jul. 21, 2010).

PCT International Preliminary Report on Patentability in International Appln. PCT/US2015/043856, dated Mar. 9, 2017, 12 pages.

* cited by examiner

REDUCED RESOLUTION LOCATION DETERMINATION FOR IMPROVED ANONYMITY OF USER LOCATION

CROSS-REFERENCE TO RELATED APPLICATION

This application is a continuation of and claims priority to U.S. patent application Ser. No. 14/502,869, filed Sep. 30, 2014, which claims priority to U.S. Provisional Patent Application No. 62/044,176, entitled "Reduced Resolution Location Determination for Improved Anonymity of User Location," filed Aug. 29, 2014, the entire contents of which are incorporated herein by reference.

TECHNICAL FIELD

This disclosure relates generally to location determination and user privacy.

BACKGROUND

Modern mobile devices are capable of performing local searches based on a current location of the mobile device. A positioning system of the mobile device can provide a current location for the local search. For example, a user may want to search for a coffee shop that is near to their current location. The accuracy of the user's current location needed to find the nearest coffee shop is different if the user is searching in a densely populated city versus a sparsely populated rural area. For example, in a city (e.g., Manhattan N.Y.), where there is a coffee shop on almost every block, a high resolution user location is needed. By contrast, in a rural area (e.g., rural Idaho), where there may be one or two coffee shops, a low resolution user location would suffice.

Due to privacy concerns, many users do not want to share their precise current location with others. When searching in densely populated areas, a more precise current location will not reveal the user's private information. However, when searching in sparsely populated areas, a search that uses a precise user location may provide search results that implicitly disclose the user's precise location and possibly reveal the user's private information.

SUMMARY

Reduced resolution location determination for improved anonymity of a user location is disclosed. In some implementations, a first location of a computing device operating in a geographic area is determined. A population density of the geographic area is estimated. A grid overlay is generated, including a number of cells based on the estimated population density. Using the grid overlay, a second location is generated for the computing device that is less precise than the first location. The less precise second location can be used in a local search or other application to improve the anonymity of the user location.

In some implementations, a method comprises: determining a first location of a computing device operating in a geographic area; estimating a population density of the geographic area; generating a grid overlay including a number of cells based on the estimated population density; and generating, using the grid overlay, a second location for the computing device that is less precise than the first location.

In some implementations, a method comprises: receiving, by a computing device, a location tile for a geographic area where access points and the computing device are operating; determining an access point density for the location tile based on the number of access points in the location tile; determining a resolution value for the location tile based on the access point density; generating a grid overlay for the location tile based on the resolution value; and determining a reduced resolution location of the computing device using the grid overlay.

Other implementations are directed to systems, devices and non-transitory, computer-readable storage mediums. Particular implementations disclosed herein provide one or more of the following advantages. Providing a reduced resolution location based on estimated population data allows a user to perform anonymous searches that do not give away their precise location. Determining reduced location resolution based on estimated population density ensures that the reduced resolution will provide the desired anonymity while also providing sufficient resolution for local search or to meet the accuracy requirements of other location-based applications.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Operating Environment

Figure 1:
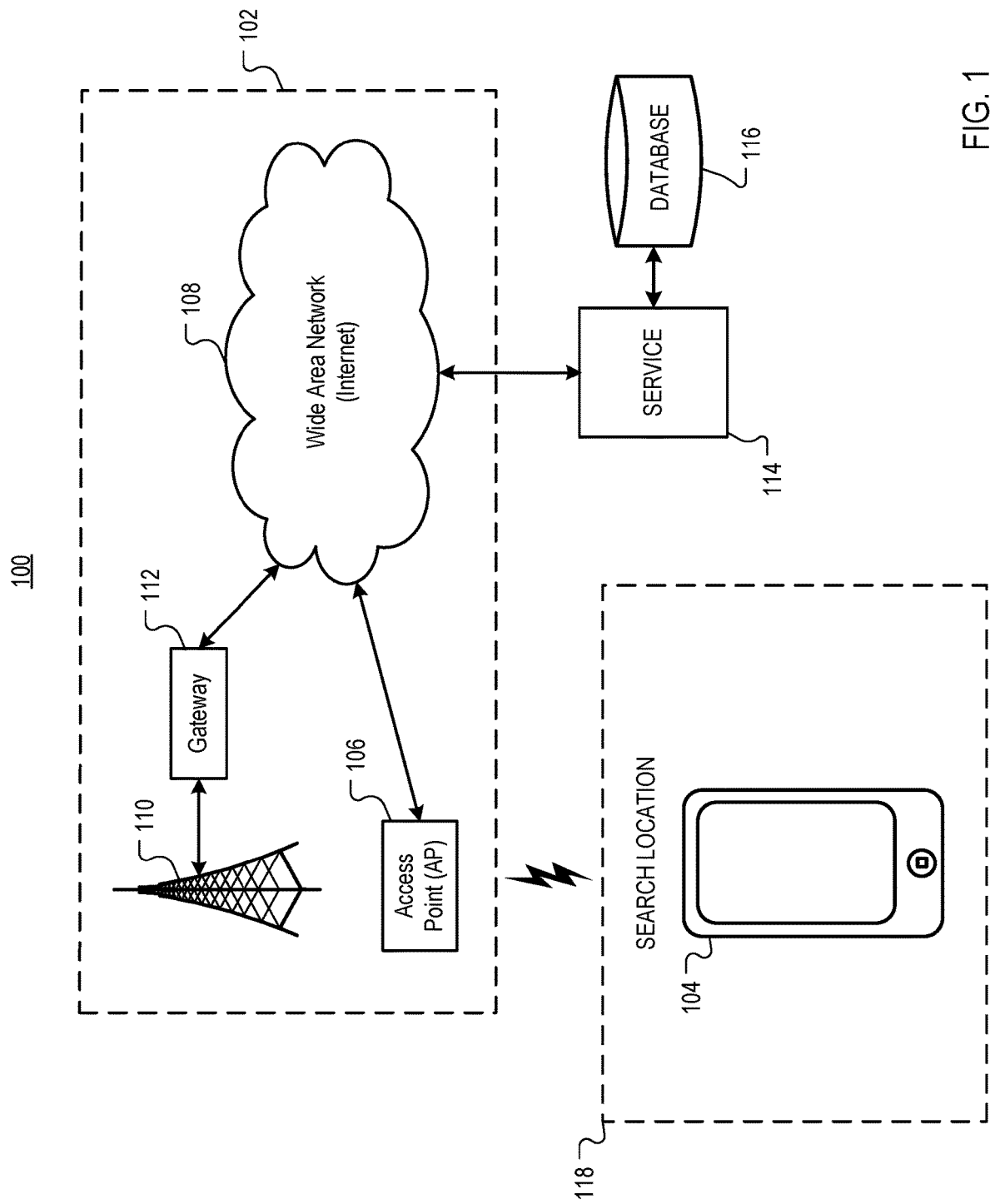
FIG. 1 illustrates an exemplary operating environment for reduced resolution location determination for improved anonymity of user location.

FIG. 1 illustrates an exemplary operating environment 100 for reduced resolution location determination for improved anonymity of user location. In some implementations, operating environment 100 can include computing device 104 operating at search location 118 and configured to be in communication with service 114 through communication network 102. Communication network 102 includes access point 106, cell tower 110, gateway 112 and wide area network 108 (e.g., the Internet). Service 114 is coupled to database 116.

In some implementations, computing device 104 can be a mobile device, including but not limited to a portable computer, smart phone, tablet computer or wearable device. Computing device 104 can include one or more satellite or terrestrial positioning systems, such as Global Positioning System (GPS), a WiFi positioning system (using API 106) or cellular position system (using cell tower 110 and gateway 112). An exemplary architecture for computing device 104 is described in reference to FIG. 6.

In some implementations, computing device 104 can include a search engine that allows a user to initiate a local search based on the current location of computing device 104. For example, a user could interact with a graphical user interface (GUI) or provide a voice command to a digital assistant to make a search query for a nearby coffee shop. The search engine uses the query and the current location of computing device 104 to search for locations of coffee shops that are near the current location of computing device 104. A map presented on a display device of computing device 104 can include markers showing the locations of nearby coffee shops found in the search. The current location of computing device 104 may also be shown on the map. A route with directions to the nearest coffee shop can be generated and displayed on the map.

The accuracy of the search results is a function of the resolution of the current location. The more accurate the current location the more accurate the search results and the navigation information provided to the user (e.g., directions, estimated distance, time of arrival). In less populated geographic areas, less accuracy is needed to provide acceptable results. For example, if the search is performed in a rural area there may be only one or two coffee shops and less accurate navigation instructions are needed. In the areas of low population density, anonymity of the user location can be improved by using a reduced resolution location to obtain acceptable search results, as described in reference to FIGS. 2-5.

In some implementations, service 114 can provide computing device 104 with WiFi transmitter locations (e.g., WiFi router locations) and other information that can be used by a WiFi positioning system to estimate the current location of computing device 104. WiFi router locations and other navigation information can be stored in database 116 and served by service 114 (e.g., a server computer) to computing device 104. In some implementations, WiFi router locations can be provided in tiles covering a geographic area where computing device 104 is located (referred to herein as "location tiles"). For example, a single location tile may cover a 5×5 km geographic area. The location tiles can be pushed or pulled from service 114 and pre-cached on computing device 104, where the location tiles can be used by a search engine and map application to generate location-based search results in response to user or application search queries.

In some implementations, AP density (e.g., the number of WiFi routers) in a geographic area covered by a location tile can be used to estimate population density for the geographic area. The AP density in a geographic area is a good approximation to population density. Different data sources can be used alone or together to estimate population density for a location tile, including AP density and/or census data.

In some implementations, to minimize data download from service 114 and runtime processing costs for computing device 104, pre-cached location tiles downloaded from service 114 for use in WiFi positioning can be used to generate reduced resolution locations. The AP counts can be mapped to resolution values in a look-up table, as described in reference to Table I. The look-up table can map a location tile that meets a threshold AP density to a resolution value that is determined empirically. The resolution value can be used to generate a grid overlay for the location tile. Specifically, the resolution value can determine the cell size and thus the number of cells in the grid overlay. The grid overlay can then be used to generate a reduced resolution location from an estimated location of a computing device, as described further in reference to FIGS. 3-5.

Example System

Figure 2:
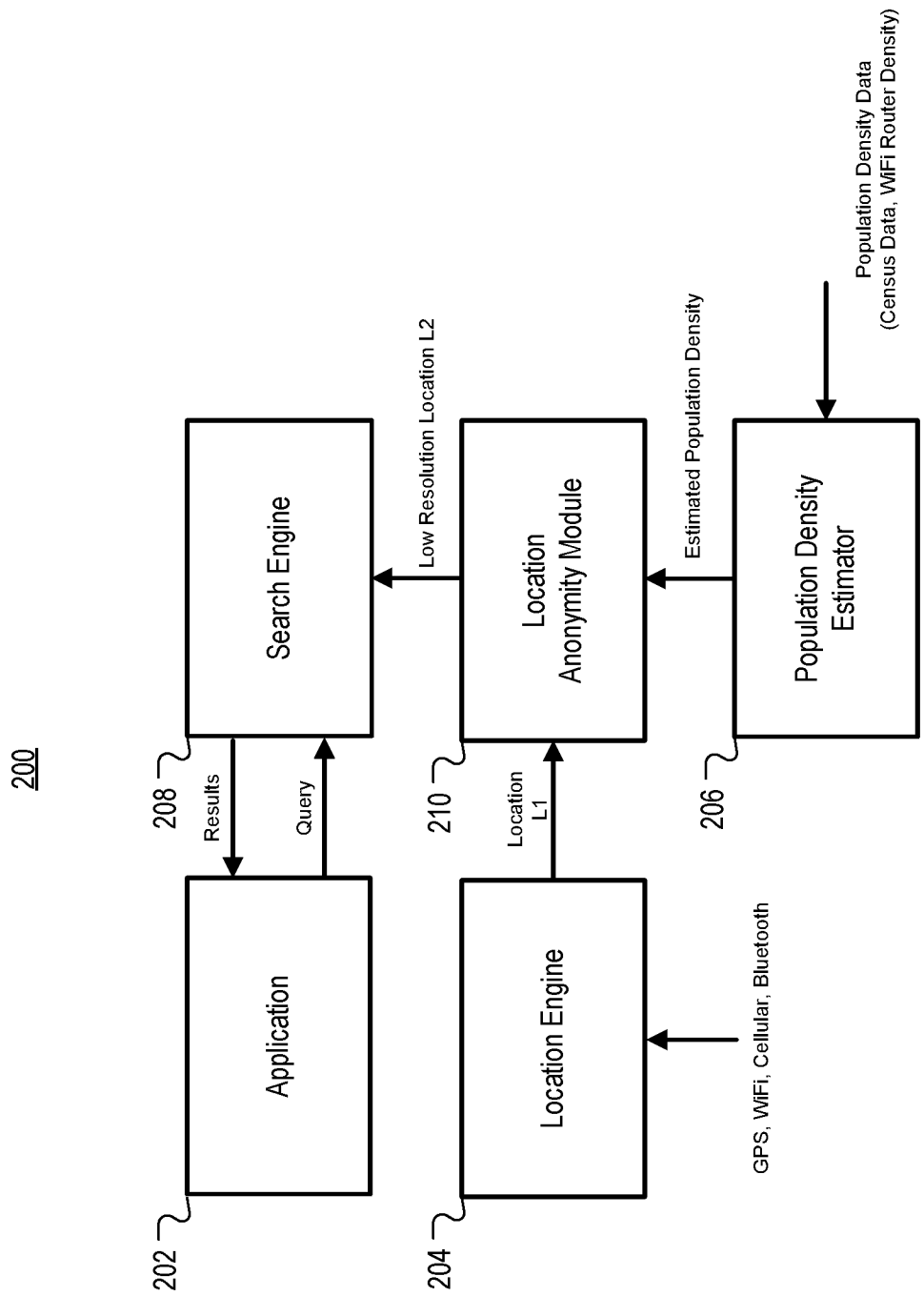
FIG. 2 is a conceptual block diagram of an example system for implementing reduced resolution location determination for improved anonymity of user location.

FIG. 2 is a conceptual block diagram of example system 200 for reduced resolution location determination for improved anonymity of user location. In some implementations, system 200 can include application 202, location engine 204, population density estimator 206, search engine 208 and location anonymity module 210. System 200 can be implemented in computing device 104 as software, hardware or a combination of software and hardware.

Application 202 can be any application running on computing device 104 that can generate a search query for local search. Search engine 208 receives a search query from application 202 and reduced resolution location L2 from location anonymity module 210 and returns search results. In some implementations, application 202 can be a map application and the search results can be locations of points of interest specified in the search query.

Location engine 204 can include a hybrid navigation system that combines location data (e.g., latitude, longitude, altitude) from one or more positioning systems, such as GPS, WiFi, cellular and beacons (e.g., Bluetooth beacons) and estimates a current location L1 of computing device 104 based on the location data. Location anonymity module 210 receives the estimated location L1 and estimated population density from population density estimator 206 and generates a reduced resolution location L2, which is provided to search engine 208 and any other applications that request a reduced resolution location estimate. In some implementations, location anonymity module 210 can obscure or "fuzz" the location estimate L1 using a grid overlay having a number of cells (cell size) based on an empirically derived resolution value, as described in reference to FIG. 5. Population density estimator 206 receives data from one or more data sources, such as AP density data and/or census data, and uses that data to generate grid overlays for location tiles.

Example Processes

Figure 3:
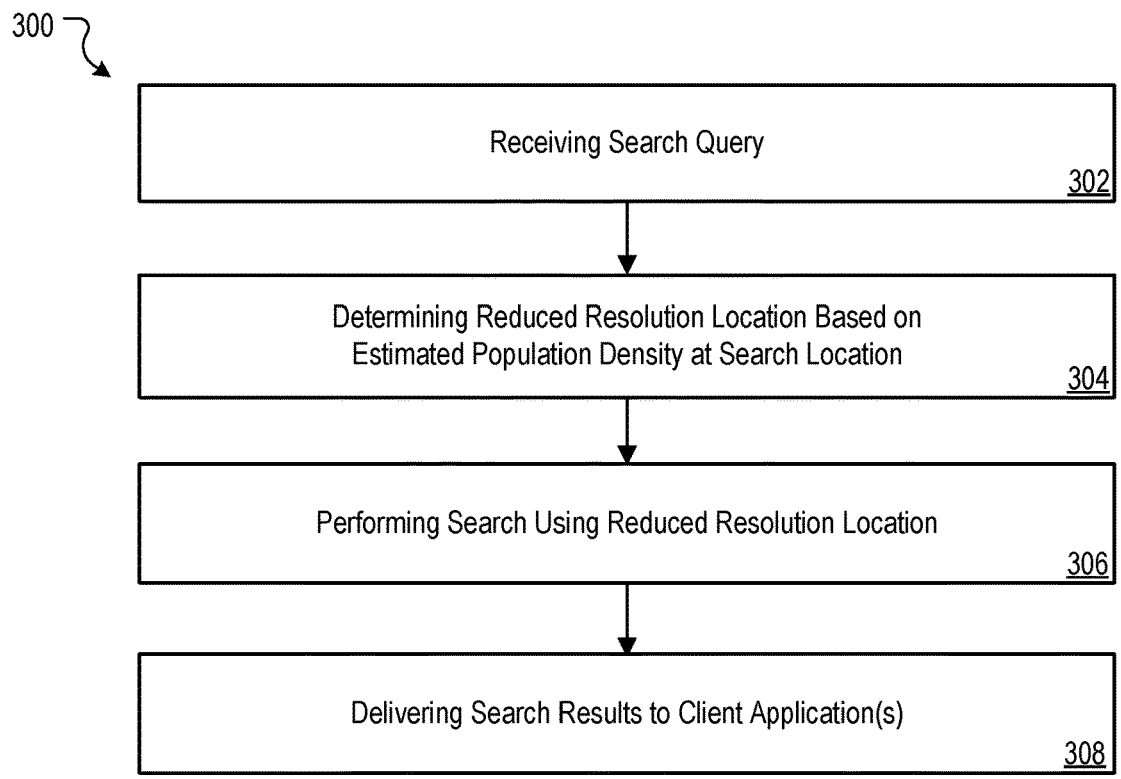
FIG. 3 is a flow diagram of an example process of performing a search using reduced resolution location determination for improved anonymity of user location.

FIG. 3 is a flow diagram of example process 300 of performing a search using reduced resolution location determination for improved anonymity of user location. In some implementations, process 300 can be implemented by device architecture 600, as described in reference to FIG. 6.

In some implementations, process 300 can begin by receiving a search query by a computing device (302). Process 300 can continue by determining a reduced resolution location for the computing device based on the estimated population density at the search location (304). For example, a geographic area that includes the estimated location of the computing device can be associated with a resolution value that is determined from the estimated population density for the geographic area. In some implementations, the estimated population density can be based on the density of APs (e.g., number of WiFi routers) in the geographic area. A grid overlay is generated for the geographic area and includes a number of cells based on the determined resolution value. For example, a geographic area having an area of 5×5 km and a resolution value of 200 meters would have a grid overlay with 625 cells, where each cell is 200×200 meters.

Process 300 can continue by performing a search using the reduced resolution location (306) and delivering the search results to one or more client applications (308). For example, the reduced resolution location can be used with a search query to determine locations of points of interest that are near the current location of the computing device without exposing the precise location of the computing device. Determining the resolution value for a location tile based on estimated population density allows an appropriate amount of offset to be applied to the estimated location of the computing device while still maintaining a desired accuracy of the search results. For example, a search for Starbucks® stores in Manhattan N.Y. would have a grid overlay with a larger number of cells (due to the large number of Starbucks® stores in the location tile) than a grid overlay for rural Idaho (due to a small number of Starbucks® stores in the location tile).

Figure 4:
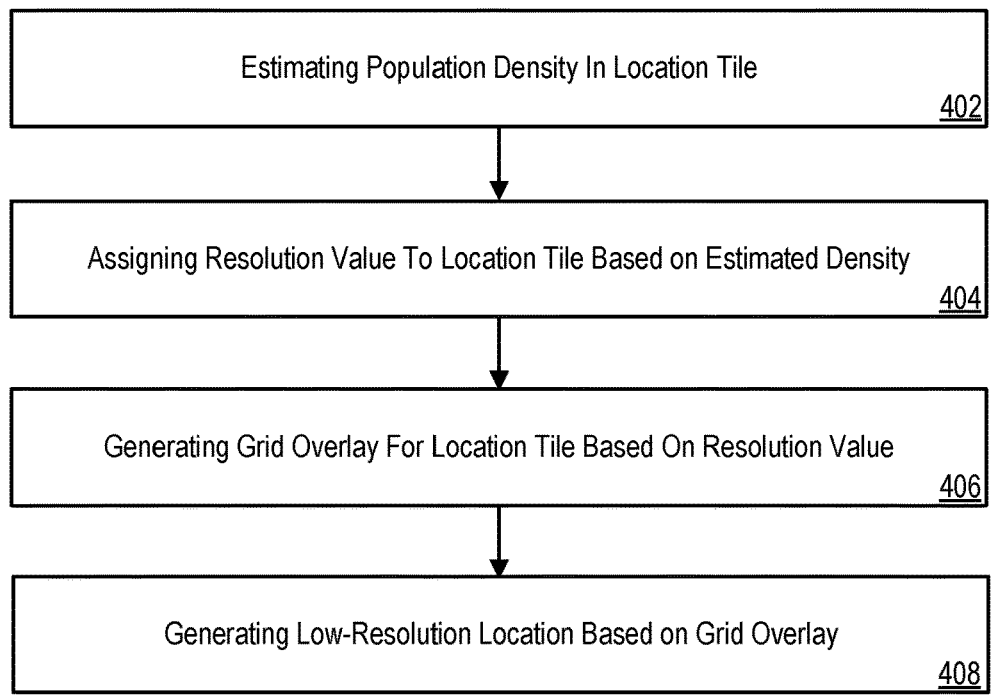
FIG. 4 is a flow diagram of an example process of determining a reduced resolution location determination for improved anonymity of user location.

FIG. 4 is a flow diagram of example process 400 of determining a low-resolution location determination for improved anonymity of user location. In some implementations, process 400 can be implemented by device architecture 600, as described in reference to FIG. 6.

In some implementations, process 400 can begin by estimating population density for a geographic area covered by a location tile based on AP density and or other data sources (e.g., census data) (402). There is a reasonable assumption that the AP density correlates with population density and can thus be used as an approximation of population density of the geographic area. In some implementations, the location tiles can be pulled or pushed from a network-based service and cached on the computing device. The location tiles can also be used for WiFi positioning of the computing device.

Process 400 can continue by assigning a resolution value to the location tile (404). The resolution value can be determined empirically from AP density data and/or census data.

Process 400 can continue by generating a grid overlay for a location tile that includes an estimated location of a computing device, where the number of cells and the size of each cell is determined by the resolution value associated with the location tile (406).

Process 400 can continue by using the grid overlay to generate a reduced resolution location for the computing device (408). For example, a cell anchor coordinate can be used with a random noise component and scale factor to generate the reduced resolution location for the computing device. Table I below is an example look-up table for resolution values. Each row is also referred to as a "bin." In this example, estimated population density is based solely on the AP count in location tiles.

TABLE I

Example Population Density/Resolution Value Mappings

| AP Count | Quantization Degree (degrees) | Resolution Value (m) |
|---|---|---|
| >=50K | 0.0005° | 50 |
| >=25K | 0.0005° | 50 |
| >=15K | 0.001° | 100 |
| >=10K | 0.002° | 200 |
| >=8K | 0.003° | 300 |
| >=5K | 0.005° | 500 |
| >=3K | 0.01° | 1000 |
| >=1K | 0.02° | 2000 |
| >=500 | 0.03° | 3000 |
| <500 | 0.05° | 5000 |
| No location tiles, error, etc. | 0.1° | 10000 |

Table I illustrates how AP density is used to determine a resolution value that can be used to generate a grid overlay for the location tile. In this example, 5×5 km location tiles are assumed. If an estimated location falls into a grid cell having an AP density (based on the WiFi router count) greater than or equal to 50K, then the quantization degree is 0.0005 and the resolution value for the location tile is about 50 meters. Location tiles that are mapped to this resolution value will have grid overlays having a number of cells based on the resolution value. For example, 5×5 km location tile has 10K tiles each of size 50 by 50 meters. In some implementations, Table I can be periodically updated as the AP densities for location tiles change beyond a threshold number.

Figure 5:
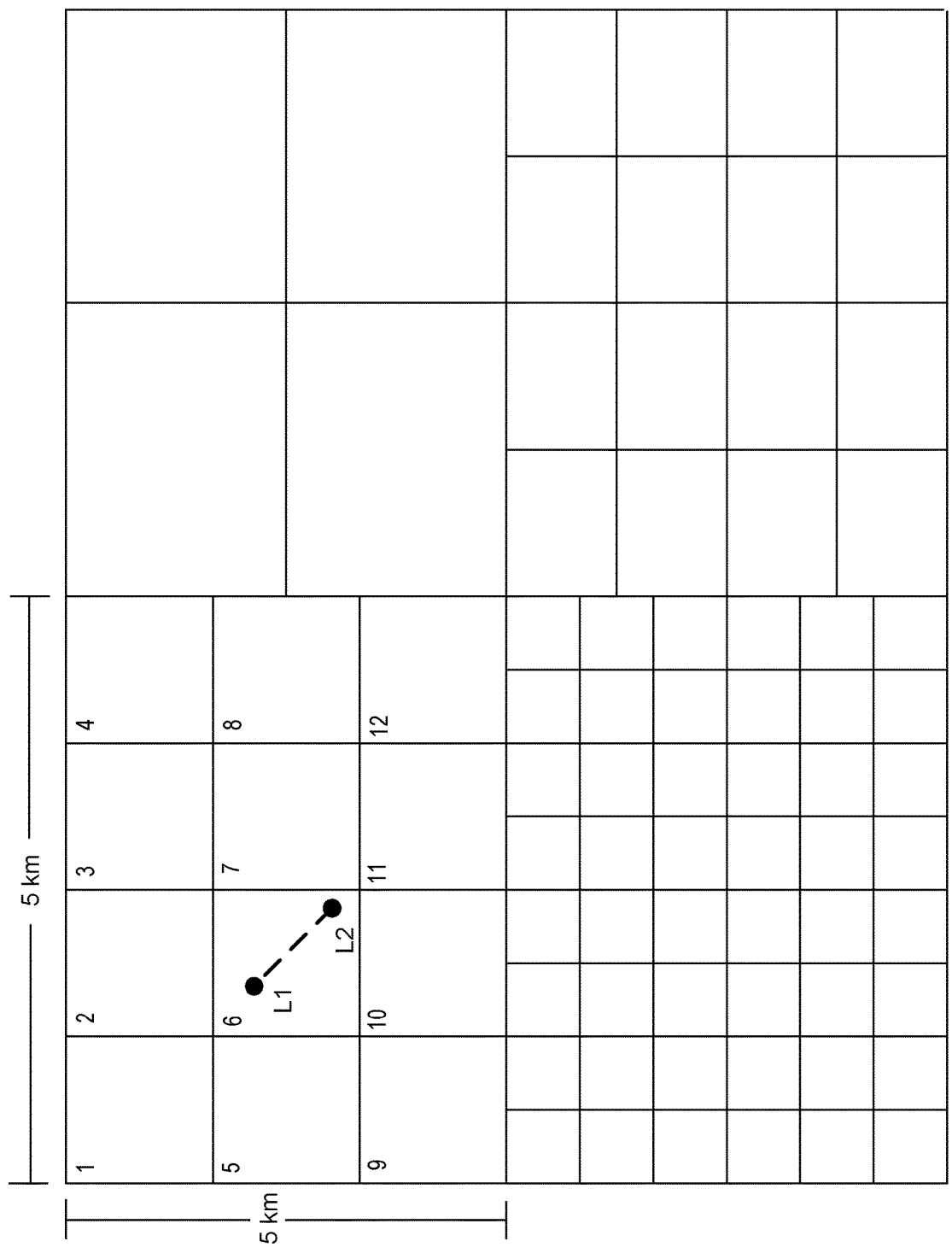
FIG. 5 is a conceptual diagram illustrating the generation and use of grid overlays on location tiles for determining reduced resolution.

FIG. 5 is a conceptual diagram illustrating the generation of grid overlays for location tiles based on estimated population density. In the diagram, there are 4 location tiles each being 5×5 km in size. It is noted that any desired location tile size can be used. In the upper left corner of the diagram, a first grid overlay includes 12 cells. In the upper right corner of the diagram, a second grid overlay includes 4 cells. In the lower left corner of the diagram, a third grid overlay includes 48 cells. In the lower right corner of the diagram, a fourth grid overlay includes 16 cells. The third grid overlay includes the most cells indicating that the estimated population density (e.g., WiFi router count) for the third location tile is the highest of the four location tiles. Likewise, the second grid overlay has the fewest cells indicating that the estimated population density for the second location is the lowest of the four location tiles.

In this example, a location estimate L1 is determined to lie in the first location tile and more particularly in cell 6. The first location tile is associated with a resolution value. The resolution value determines the size of cell 6. Based on Table I, if the first location tile includes more than 10K WiFi routers, the estimated location L1 is quantized by 0.002, resulting in a resolution value of 200 meters. The number of cells in the first grid overlay would be 625 and the size of each cell would be 200×200 meters. Depending on the number of cells in the grid overlay, the resolution value will increase (more cells of smaller size) or decrease (fewer cells of larger size), as shown in FIG. 5.

In some implementations, the reduced resolution location L2 can be computed by setting the latitude and longitude of location L2 equal to the latitude and longitude of one of the center or a corner of cell 6 (hereafter referred to as "cell anchor coordinates"). In other implementations, a pseudo random number generates a random noise component that is constrained to ensure that the reduced resolution location L2 is located within the geographic boundaries of cell 6. Equation [1] describes an example function for generating a reduced resolution location L2 as a function of cell anchor coordinates and a random noise component:

$$Loc\_L2(\quad)=cell\_anchor\_coords(\ )+random\_number*SFactor, \quad [1]$$

where random_number is a pseudo random number with standard deviation of 1.0 (e.g., generated from a Gaussian distribution) and SFactor is a value (e.g., 0.001°) that is selected to constrain Loc_L2( ) to be within the geographic boundaries of cell 6. In some implementations, if Loc_L2 is outside the geographic boundaries of cell 6, Loc_L2( ) can be "snapped" to a location in cell 6 (e.g., snapped to the center, side or corner of cell 6). In some implementations, the seed for the pseudorandom number generator can be determined from a unique characteristic of the computing device (e.g., configuration data, electrical characteristics) and/or an application (e.g., generate a seed from a message digest or hash of a search query).

Example Client Architecture

Figure 6:
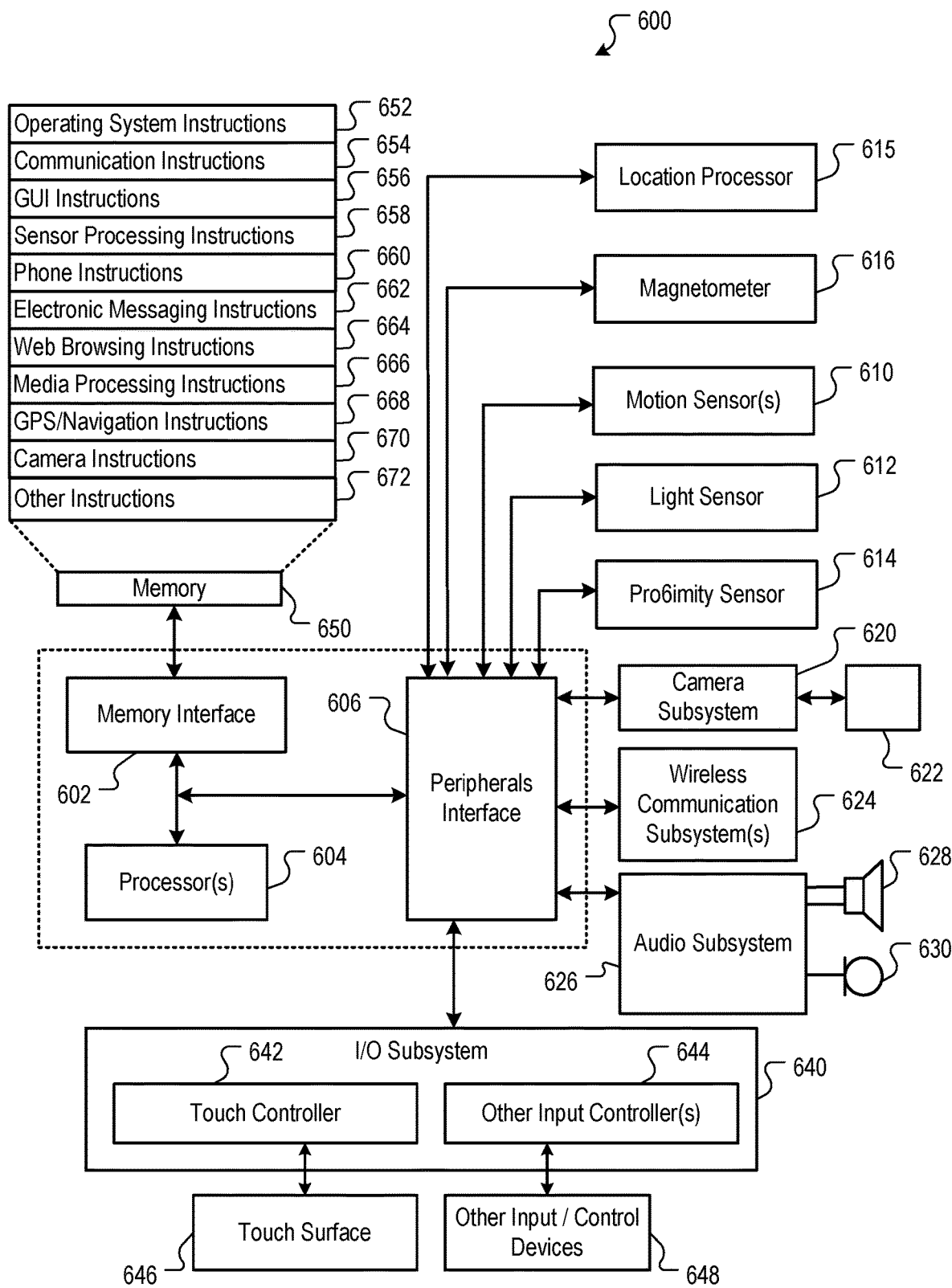
FIG. 6 is a block diagram of example client device architecture for implementing the features and processes described in reference to FIGS. 1-5.

FIG. 6 is a block diagram of example client device architecture 600 for implementing the features and processes described in reference to FIGS. 1-5. Architecture 600 may be implemented in any mobile device for generating the features described in reference to FIGS. 1-5, including but not limited to portable computers, smart phones and tablet computers, game consoles, wearable computers and the like. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor 610, light sensor 612, and proximity sensor 614 may be coupled to peripherals interface 606 to facilitate orientation, lighting, and proximity functions of the device. For example, in some implementations, light sensor 612 may be utilized to facilitate adjusting the brightness of touch surface 646. In some implementations, motion sensor 610 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 606, such as a temperature sensor, a biometric sensor, or other sensing device, to facilitate related functionalities.

Location processor 615 (e.g., GPS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used as an electronic compass.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 624 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 626 may be coupled to a speaker 628 and one or more microphones 630 to facilitate voice-enabled functions, such as voice recognition, voice replication, digital recording, and telephony functions.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device 600 may present recorded audio and/or video files, such as MP3, AAC, and MPEG video files. In some implementations, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device. Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and other instructions 672 for performing some or all of the processes, as described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining a population census for a geographic area;
   responsive to receiving a query by a computing device operating in the geographic area,
   determining a first location of the computing device operating in the geographic area;
   generating a grid overlay for the geographic area, the grid overlay including a number of grid-cells having a grid-cell size, wherein the grid-cell size is determined based on the determined population census and a predetermined relation of the population census to grid-cell sizes; and
   generating, using the grid overlay, a second location for the computing device that is less precise than the first location, where the second location is determined by a position coordinate of a grid-cell in the grid overlay that includes the first location of the computing device, and
   where the method is performed by at least one hardware processor.

2. The method of claim 1, where generating, using the grid overlay, the second location for the computing device that is less precise than the first location, further comprises:
   determining anchor coordinates for the grid-cell in the grid overlay that includes the first location of the computing device; and
   generating the second location from the anchor coordinates.

3. The method of claim 2, where generating the second location from the anchor coordinates further comprises:
   generating a random noise component; and
   setting the second location coordinates equal to a sum of the anchor coordinates and the random noise component.

4. The method of claim 3, where generating the random noise component further comprises:
   generating, by a random number generator, a random number based on a Gaussian distribution; and
   forming a product of the random number and a scale factor, where the scale factor constrains the second location to be within the grid-cell that includes the first location of the computing device.

5. The method of claim 1, where determining the first location of the computing device operating in the geographic area further comprises:
   determining the first location of the computing device based on geographic locations of access points operating in the geographic area.

6. The method of claim 1, further comprising:
   searching for points of interest near the first location of the computing device, the search using the second location of the computing device; and
   providing search results to a client application.

7. A method comprising:
   receiving, by a computing device, a location tile for a geographic area where a number of wireless access points and the computing device are operating;
   determining a population census for the location tile;
   generating a grid overlay for the location tile having a grid-cell size, wherein the grid-cell size is determined based on the population census and a predetermined relation of population census to grid-cell sizes; and
   determining a reduced resolution location of the computing device using the grid overlay, where the reduced resolution location is a position coordinate of a grid-cell in the grid overlay that includes a location of the computing device.

8. The method of claim 7, where the location tile includes locations of the access points and the method further comprises:
   determining the location of the computing device based on the locations of the access points.

9. The method of claim 7, where determining the reduced resolution location of the computing device using the grid overlay, further comprises:
   setting the reduced resolution location of the computing device to anchor coordinates of the grid-cell in the grid overlay that includes the location of the computing device.

10. The method of claim 9, where the anchor coordinates indicate a geographic location for a corner of the grid-cell.

11. The method of claim 10, where determining the reduced resolution location of the computing device using the grid overlay, further comprises:
setting the reduced resolution location of the computing device to a sum of anchor coordinates of the grid-cell in the grid overlay that includes the location of the computing device and a random noise component.

12. The method of claim 11, where the random noise component is constrained so that reduced resolution location is located within geographic boundaries of the grid-cell.

13. A computing device, comprising:
one or more processors;
memory coupled to the one or more processors and storing instructions, which, when executed by the one or more processors, causes the one or more processors to perform operations comprising:
determining a population census for a geographic area;
responsive to receiving a query by the computing device operating in the geographic area, determining a first location of the computing device operating in the geographic area;
generating a grid overlay for the geographic area, the grid overlay including a number of grid-cells having a grid-cell size, wherein the grid-cell size is determined based on the determined population census and a predetermined relation of the population census to grid-cell sizes; and
generating, using the grid overlay, a second location for the computing device that is less precise than the first location, where the second location is determined by a position coordinate of a grid-cell in the grid overlay that includes the first location of the computing device.

14. The computing device of claim 13, where generating, using the grid overlay, the second location for the computing device that is less precise than the first location, further comprises:
determining anchor coordinates for the grid-cell in the grid overlay that includes the first location of the computing device; and
generating the second location from the anchor coordinates.

15. The computing device of claim 14, where generating the second location from the anchor coordinate further comprises:
generating a random noise component; and
setting the second location coordinates equal to a sum of the anchor coordinates and the random noise component.

16. The computing device of claim 15, where generating the random noise component further comprises:
generating, by a random number generator, a random number based on a Gaussian distribution; and
forming a product of the random number and a scale factor, where the scale factor constrains the second location to be within the grid-cell that includes the first location of the computing device.

17. The computing device of claim 13, where determining the first location of the computing device operating in a geographic area further comprises:
determining the first location of the computing device based on geographic locations of access points operating in the geographic area.

18. The computing device of claim 15, further comprising instructions, which, when executed by the one or more processors, causes the one or more processors to perform operations including:
searching for points of interest near the first location of the computing device, the search using the second location of the computing device; and
providing search results to a client application.

19. A computing device comprising:
one or more processors;
memory coupled to the one or more processors and storing instructions, which, when executed by the one or more processors, causes the one or more processors to perform operations comprising:
receiving, by the computing device, a location tile for a geographic area where a number of wireless access points and the computing device are operating;
determining a population census for the location tile;
generating a grid overlay for the location tile having a grid-cell size wherein the grid-cell size is determined based on the determined population census and a predetermined relation of population census to grid-cell sizes; and
determining a reduced resolution location of the computing device using the grid overlay, where the reduced resolution location is a position coordinate of a grid-cell in the grid overlay that includes a location of the computing device.

20. The computing device of claim 19, where the location tile includes locations of the access points and the one or more processors further include an operation of:
determining the location of the computing device based on the locations of the access points.

* * * * *